(12) United States Patent
Ikeda

(10) Patent No.: US 10,576,548 B2
(45) Date of Patent: Mar. 3, 2020

(54) INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Yoshihito Ikeda, Ritto (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 16/078,347

(22) PCT Filed: Feb. 23, 2017

(86) PCT No.: PCT/JP2017/006821
§ 371 (c)(1),
(2) Date: Aug. 21, 2018

(87) PCT Pub. No.: WO2017/146143
PCT Pub. Date: Aug. 31, 2017

(65) Prior Publication Data
US 2019/0061012 A1 Feb. 28, 2019

(30) Foreign Application Priority Data
Feb. 24, 2016 (JP) .................. 2016-033035

(51) Int. Cl.
*B23B 27/16* (2006.01)
*B23B 27/14* (2006.01)
(52) U.S. Cl.
CPC ........ *B23B 27/145* (2013.01); *B23B 27/1603* (2013.01); *B23B 2200/0447* (2013.01);
(Continued)

(58) Field of Classification Search
CPC ............. B23B 27/145; B23B 27/1603; B23B 27/1611; B23B 27/1607; B23B 27/1622;
(Continued)

(56) References Cited

U.S. PATENT DOCUMENTS 4,065,223 A * 12/1977 Nelson ................ B23B 27/1614
407/114
5,634,745 A * 6/1997 Wiman ................. B23B 27/141
407/113
(Continued)

FOREIGN PATENT DOCUMENTS

JP       2004-237438 A      8/2004
JP       2013176834 A  *   9/2013    ............ B23C 5/109
WO   WO-2005118187 A1 * 12/2005    ............ B23B 27/141

*Primary Examiner* — Ryan C Rufo

(74) *Attorney, Agent, or Firm* — Viering, Jentschuara & Partner MBB

(57) ABSTRACT

An insert includes a first surface having a corner portion, a second surface, a third surface, and a cutting edge. The cutting edge is provided with a first cutting edge located on the corner portion and a second cutting edge adjacent to the first cutting edge, and the third surface is provided with a first portion located along the first cutting edge and a second portion located along the second cutting edge. the second portion includes a first region having a first end portion and a second end portion, and a second region having a third end portion and a fourth end portion. An inclination angle θ212 at the second end portion is greater than an inclination angle (Continued)

θ211 at the first end portion, and an inclination angle θ222 at the fourth end portion is smaller than an inclination angle θ221 at the third end portion.

16 Claims, 17 Drawing Sheets

(52) U.S. Cl.
CPC . *B23B 2200/0452* (2013.01); *B23B 2200/201* (2013.01); *B23B 2200/245* (2013.01); *B23B 2200/28* (2013.01); *B23B 2224/04* (2013.01); *B23B 2224/20* (2013.01); *B23B 2224/32* (2013.01); *B23B 2224/36* (2013.01); *B23B 2228/04* (2013.01); *B23B 2228/08* (2013.01)

(58) Field of Classification Search
CPC ... B23B 27/16; B23B 27/164; B23B 27/1651; B23B 2200/201; B23B 2200/204; B23B 2200/28; B23B 2200/286
See application file for complete search history.

(56) References Cited

U.S. PATENT DOCUMENTS

| | | | |
|---|---|---|---|
| 6,074,137 A * | 6/2000 | Betman | B23B 27/145 407/103 |
| 2003/0031520 A1* | 2/2003 | Hintze | B23B 27/141 407/114 |
| 2003/0059265 A1* | 3/2003 | Brockett | B23B 27/141 407/114 |
| 2003/0077131 A1* | 4/2003 | Wiman | B23B 27/141 407/114 |
| 2003/0230182 A1* | 12/2003 | Oles | B23B 27/005 83/743 |
| 2004/0146365 A1 | 7/2004 | Usui et al. | |
| 2005/0254908 A1* | 11/2005 | Norstrom | B23B 27/145 407/113 |
| 2008/0304924 A1* | 12/2008 | Engstrom | B23C 5/202 407/114 |
| 2009/0060665 A1* | 3/2009 | Lof | B23B 27/145 407/116 |
| 2017/0320143 A1* | 11/2017 | Lof | B23B 27/141 |
| 2018/0345383 A1* | 12/2018 | Ikeda | B23B 27/145 |

* cited by examiner

INSERT, CUTTING TOOL, AND METHOD FOR MANUFACTURING MACHINED PRODUCT

TECHNICAL FIELD

The present aspect relates to an insert, a cutting tool, and a method for manufacturing a machined product.

BACKGROUND ART

The tip (insert) described in Patent Literature 1 has been known as an insert used in machining. The tip described in Patent Literature 1 includes a nose cutting edge, a flat cutting edge, and a linear cutting edge. The tip described in Patent Literature 1, in which an angle formed by a relief face and a rake face is 90°, is a so-called negative type tip. In the above-described negative type tip, it is possible that the tip contacts a workpiece, and thus smoothness of a worked surface of the workpiece is affected.

CITATION LIST

Patent Literature

Patent Literature 1: JP 2004-237438 A

SUMMARY OF INVENTION

An insert based on an aspect includes a first surface having a corner portion, a second surface, a third surface located between the first surface and the second surface, a cutting edge located on at least part of a portion on which the first surface and the third surface intersect, and a central axis passing through a center of the first surface and a center of the second surface. The cutting edge includes a first cutting edge located on the corner portion, and a second cutting edge adjacent to the first cutting edge. The third surface is provided with a first portion located along the first cutting edge, and a second portion located along the second cutting edge. Additionally, the second portion includes a first region having a first end portion and a second end portion, and a second region having a third end portion and a fourth end portion. An inclination angle θ212 at the second end portion is greater than an inclination angle θ211 at the first end portion, and an inclination angle θ222 at the fourth end portion is smaller than an inclination angle θ221 at the third end portion.

DESCRIPTION OF EMBODIMENT

Figure 1:
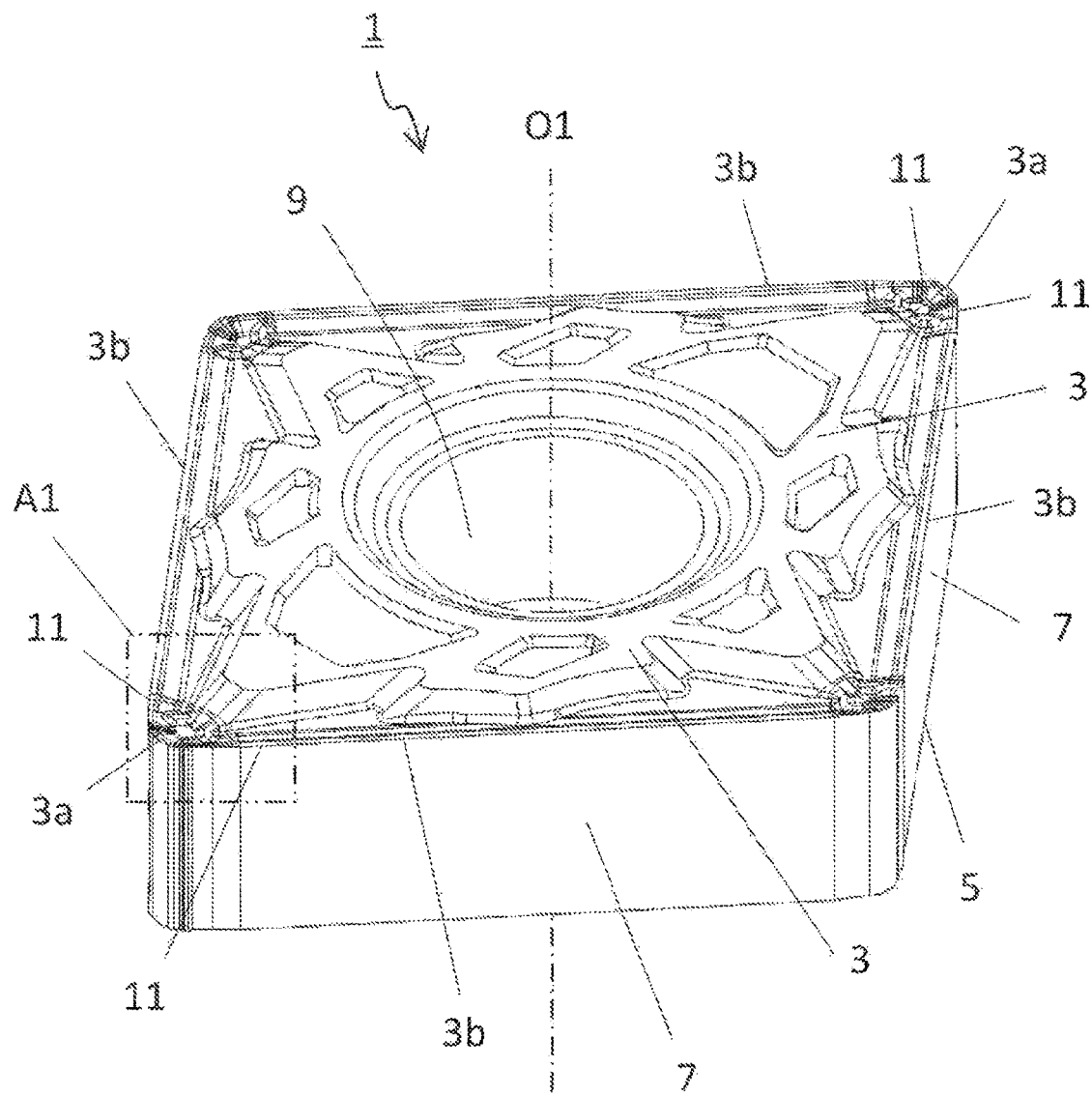
FIG. 1 is a perspective view illustrating an insert of an embodiment.

A detailed description will be given below of a cutting insert (referred to below also as "the insert") and a cutting tool provided with the insert according to an embodiment of the present disclosure, using the drawings. However, for ease of explanation, each of the drawings referenced below is simplified and illustrates only the main constituent members needed to describe embodiments. Accordingly, the insert and the cutting tool of the present disclosure may be provided with any constituent member which is not illustrated in the referenced drawings. Further, the dimensions of the members in the drawings do not faithfully represent the actual dimensions of the constituent members, the dimension ratios of the members, or the like. The above-described points are similarly applied to a method for manufacturing a machined product described later.

Insert

First, an insert 1 of an embodiment is described while referencing the drawings. The insert 1 of the present embodiment is used as an insert in a cutting edge replaceable-type turning tool used for outer diameter processing, or the like.

The insert 1 of the present embodiment includes, as illustrated in FIG. 1 and the like, a first surface (referred to below also as top surface) 3, a second surface (referred to below also as bottom surface) 5, a third surface (referred to below also as side surface) 7, a through-hole 9, and a cutting edge 11. In the present embodiment, the insert 1 is formed in a substantially square plate shape.

Figure 2:
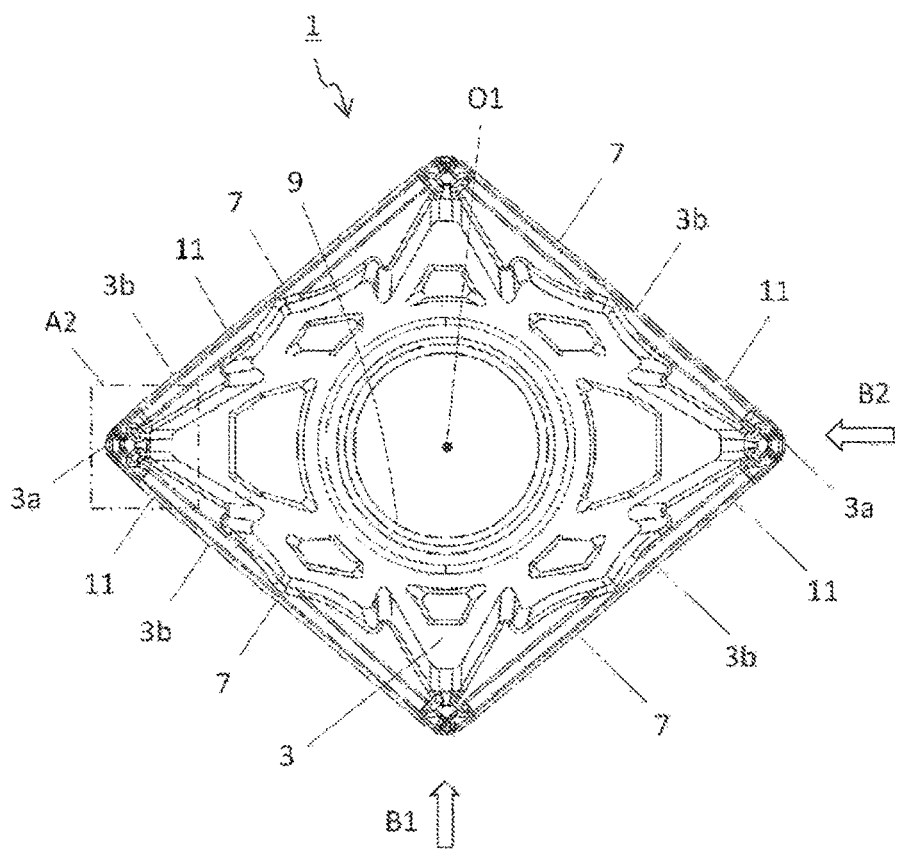
FIG. 2 is a top view of the insert illustrated in FIG. 1.

The top surface 3 is a surface, at least part of which functions as a rake face. Additionally, the top surface 3 is, as illustrated in FIG. 2, a quadrilateral shape, and includes at least one corner portion 3a and a plurality of side portions 3b. Four corner portions are composed of two acute angles and two obtuse angles. In FIG. 2, each of the two acute angles is the "corner portion 3a" and the "side portion 3b" extends from the corner portion 3a. The top surface 3 of the present embodiment is line symmetric with respect to a virtual line connecting the two corner portions 3a, but the configuration is not particularly limited thereto.

Note that, each of the corner portions 3a of the top surface 3 in the present embodiment is not a strict corner but, rather, as illustrated in FIG. 2 and the like, is formed in a rounded shape. Additionally, the side portion 3b on the top surface 3 is not strictly limited to a linear shape, and may include a region in a curved shape.

The bottom surface 5 is a surface located on a side opposite the top surface 3, and functions as a seating face when the insert 1 is attached to a holder. The bottom surface 5 in the present embodiment has, similar to the top surface 3, a polygonal shape, specifically, a quadrilateral shape. Additionally, the bottom surface 5 has an identical shape to the top surface 3, and the top surface 3 and the bottom surface 5 overlap in a top surface view. Note that, the bottom surface 5 may be slightly smaller than the top surface 3. In this case, the bottom surface 5 is a similar figure to the top surface 3.

Respective shapes of the top surface 3 and the bottom surface 5 are not limited to those in the embodiment described above. While the respective shapes of the top surface 3 and the bottom surface 5 of the insert 1 in the present embodiment are quadrilateral shapes in a top surface view of the insert 1, the respective shapes of the top surface 3 and the bottom surface 5 may be triangular shapes, pentagonal shapes, or hexagonal shapes in a top surface view of the insert 1. Additionally, when the respective shapes of the top surface 3 and the bottom surface 5 are quadrilateral shapes, the respective shapes of the top surface 3 and the bottom surface 5 may be rectangular shapes, parallelogram shapes, rhombus shapes, or square shapes.

Figure 3:
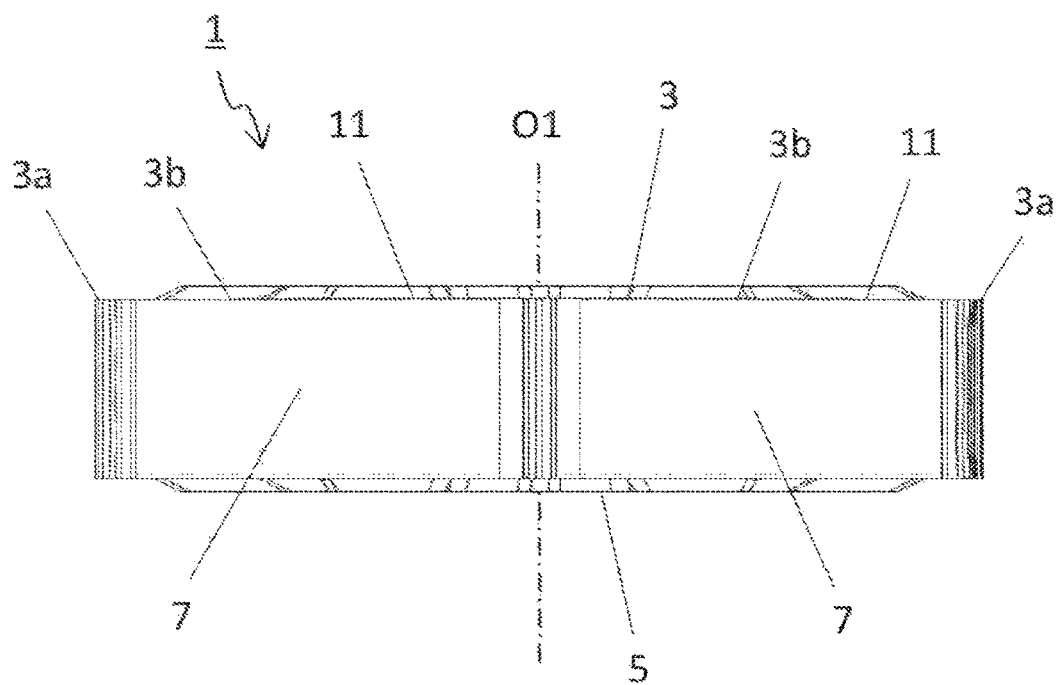
FIG. 3 is a side view of the insert illustrated in FIG. 2 as viewed from a B1 direction.
Figure 4:
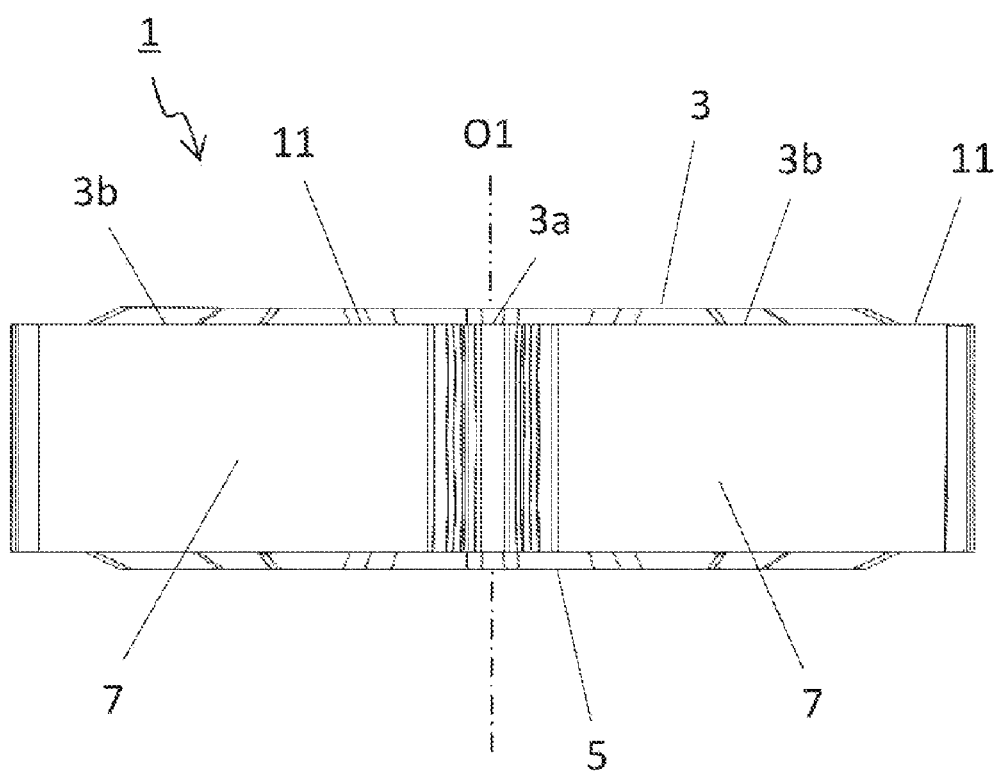
FIG. 4 is a side view of the insert illustrated in FIG. 2 as viewed from a B2 direction.

In the present embodiment, at least part of the side surface 7 functions as a relief face. As illustrated in FIG. 1, FIG. 3, and the like, the side surfaces 7 are located between the top surface 3 and the bottom surface 5, and are each connected with the top surface 3 and the bottom surface 5. More specifically, the side surface 7 includes an approximately flat region (below the side portion 3b) and a curved region (below the corner portion 3a) located between the flat regions.

Examples of a material of the insert 1 include cemented carbide alloy, cermet, or the like. Examples of composition of the cemented carbide alloy include WC—Co, WC—TiC—Co, WC—TiC—TaC—Co, or the like. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound such as titanium carbide (TiC) or titanium nitride (TiN) is the primary component.

A surface of the insert 1 may be coated with a coating film using a chemical vapor deposition (CVD) method or a physical vapor deposition (PVD) method. Examples of composition of the coating film include titanium carbide (TiC), titanium nitride (TiN), titanium carbonitride (TiCN), alumina ($Al_2O_3$), and the like, for example.

As illustrated in FIG. 1, the through-hole 9 penetrates from a center of the top surface 3 to a center of the bottom surface 5. The through-hole 9 is provided for securing the insert 1 to a holder of a cutting tool. Specifically, for example, the through-hole 9 is provided for screw insertion when the insert 1 is screw-fastened and secured to a holder of a cutting tool. A method for securing the insert 1 to a holder is not limited to the above-described screw-fastening and securing method. For example, also when the insert 1 is secured to a holder with a clamper or a lever, the through-hole 9 is utilized. In this case, the through-hole 9 may not penetrate to the bottom surface 9.

In the present embodiment, an axis of the through-hole 9 is coincident with a central axis O1, passing through the center of the top surface 3 and the center of the bottom surface 5, of the insert 1. In addition, an axis direction of the through-hole 9 is orthogonal to the top surface 3 and the bottom surface 5. Note that, the through-hole 9 is not limited to be configured to be located from the center of the top surface 3 and the center of the bottom surface 5. For example, the through-hole 9 may be located between mutually facing regions located in the side surfaces 7.

A maximum width of the top surface 3 in a top surface view in the present embodiment is, for example, from 6 to 25 mm. Here, the maximum width of the top surface 3 in the top surface view is, according to FIG. 2, a distance between the two corner portions 3a. In addition, a height from the bottom surface 5 to the top surface 3 is, for example, from 1 to 10 mm. Here, the height from the bottom surface 5 to the top surface 3 refers to a length between an upper end of the top surface 3 and a lower end of the bottom surface 5 in a direction parallel to the central axis O1.

The cutting edge 11 is used for machining a workpiece, and as illustrated in FIG. 1, FIG. 2, and the like, is located on at least part of a ridge portion being a portion on which the top surface 3 and the side surface 7 intersect. In other words, the cutting edge 11 is at least part of the corner portion 3a and the side portion 3b connected with the corner portion 3a. Note that, the cutting edge 11 may be located along the entire side portion 3b.

Portions where the top surface 3 and the side surfaces 7 intersect and the cutting edges 11 are formed may have been subjected to a so-called honing process. When having been subjected to the honing process, each of the portions where the top surface 3 and the side surfaces 7 intersect is not formed in a strict linear shape by the intersection of the two surfaces, but formed in a slightly curved surface shape. By being subjected to the honing process, strength of the cutting edge 11 can be enhanced.

Figure 5:
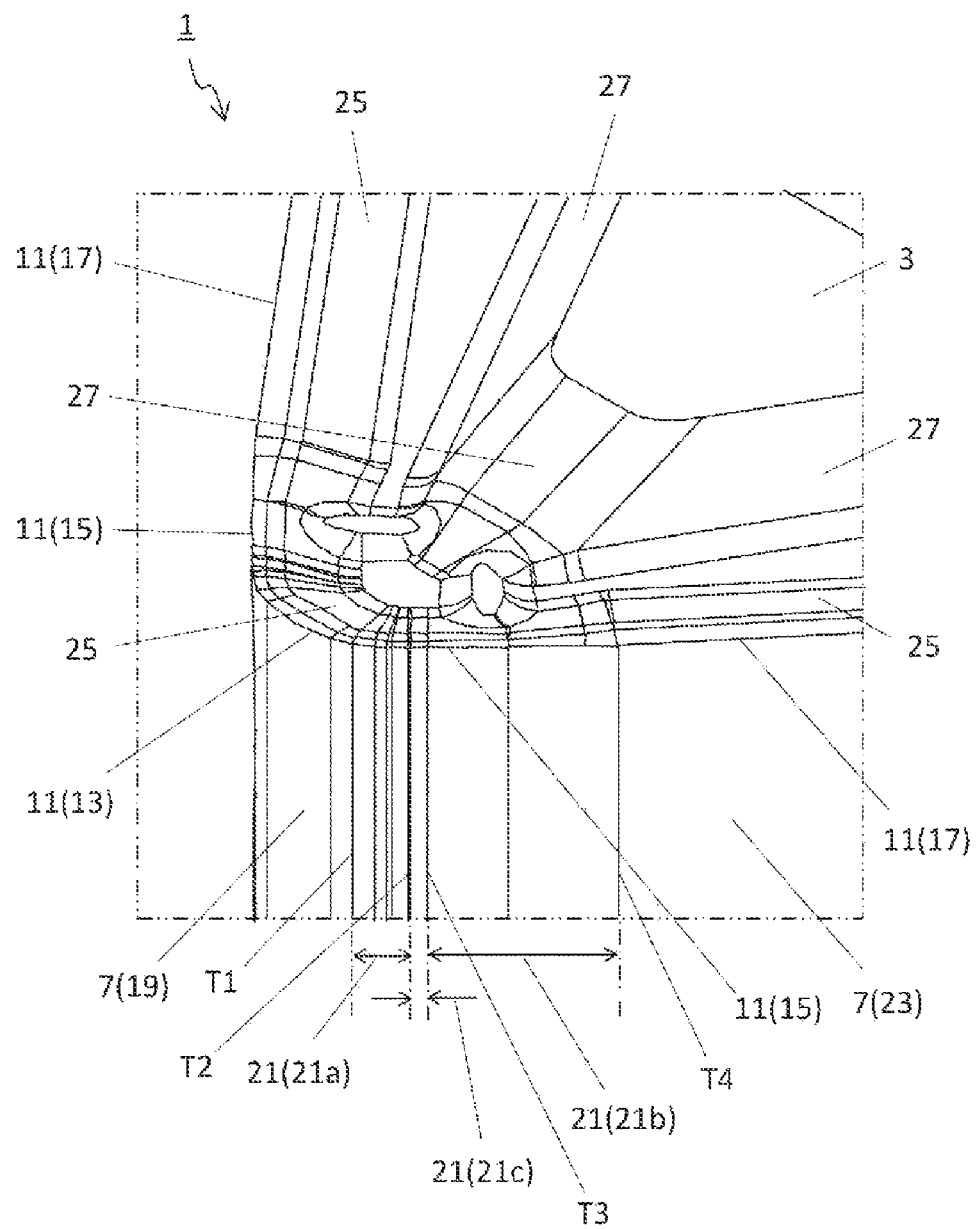
FIG. 5 is an enlarged view of a region A1 illustrated in FIG. 1.
Figure 6:
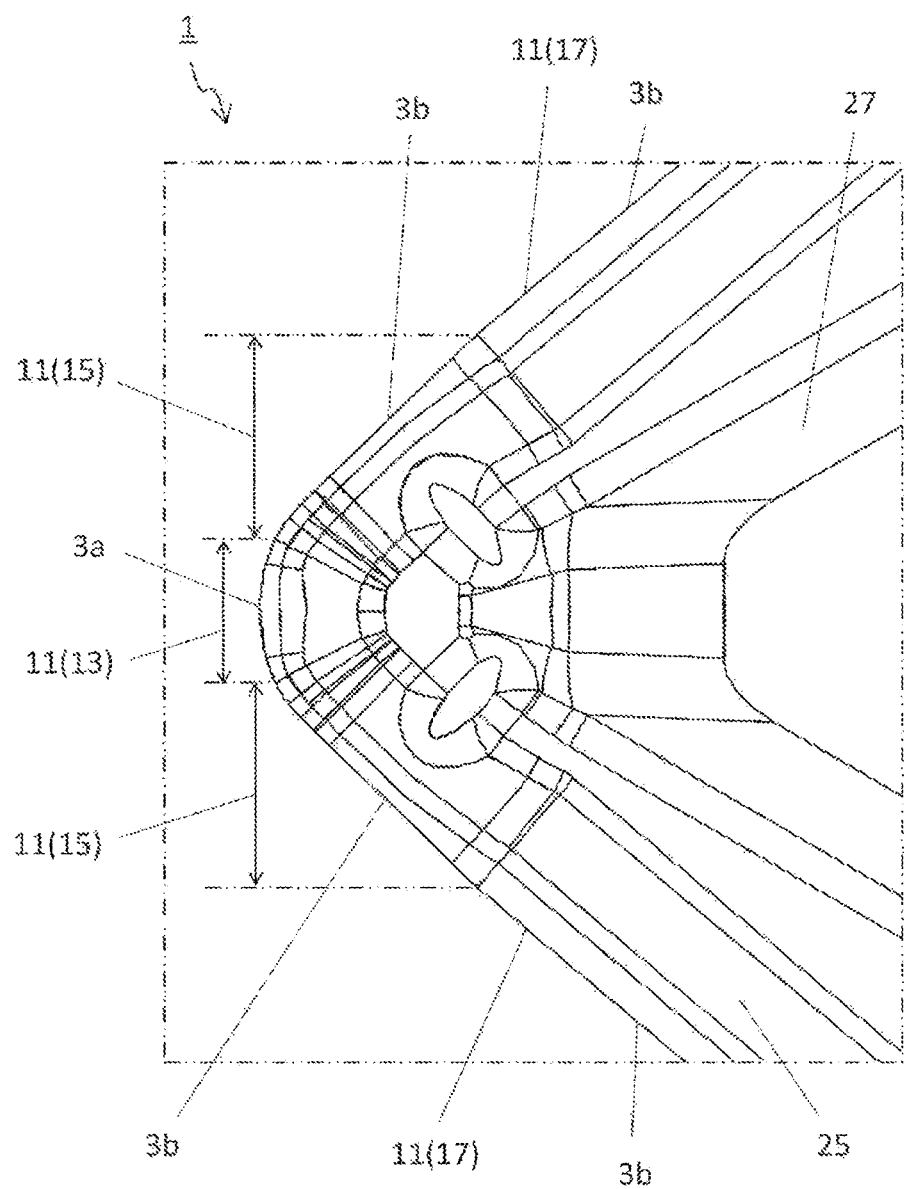
FIG. 6 is an enlarged view of a region A2 illustrated in FIG. 2.
Figure 7:
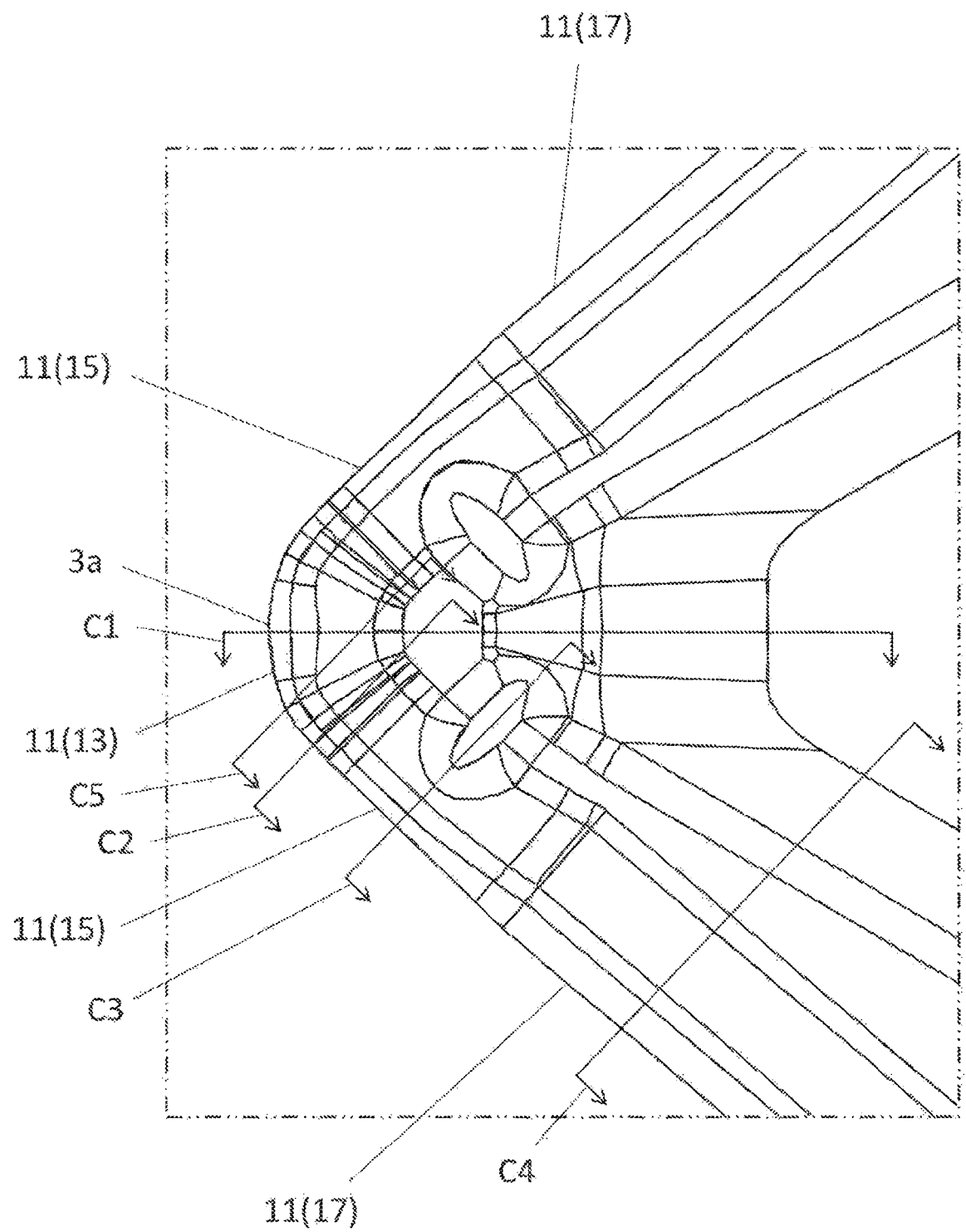
FIG. 7 is an enlarged view illustrating an identical region to the region illustrated in FIG. 6.

In the present embodiment, the cutting edge 11 includes, as illustrated in FIG. 5, FIG. 6 and the like, a first cutting edge 13 and a second cutting edge 15 in order from the corner portion 3a.

The first cutting edge 13 is located on the corner portion 3a of the top surface 3, and can be used as a so-called corner cutting edge. As described above, the corner portion 3a of the top surface 3 has a rounded shape in a top view. Thus, the first cutting edge 13 has a rounded shape in the top view. Specifically, the first cutting edge 13 has an arc shape protruding outward in the top view.

The second cutting edge 15 is located from the corner portion 3a to the side portion 3b of the top surface 3, and can be used as a so-called flat cutting edge or a wiper cutting edge. The second cutting edge 15 is adjacent to the first cutting edge 13. More specifically, an end portion on the corner portion 3a side of the second cutting edge 15 is connected to the first cutting edge 13. In the top view, the second cutting edge 15 is formed in a convex curved line shape that slightly protrudes outward. Note that, in the insert 1 of the present embodiment, two side portions 3b extend from one corner portions 3a. Accordingly, two second cutting edges 15 exist for one first cutting edge 13.

In the present embodiment, as illustrated in FIG. 5, the side surface 7 includes a first portion 19 and a second portion 21. The first portion 19 is located along the first cutting edge 13. The second portion 21 is located along the second cutting edge 15. As each of the first portion 19 and the second portion 21 is located along the cutting edge 11, at least a part thereof functions as a so-called relief face. Note that the first portion 19 and the second portion may not be located from the top surface 3 to the bottom surface 5.

In the present embodiment, as illustrated in FIG. 5, the second portion 21 includes a first region 21a and a second region 21b. The first region 21a is located on a side of the first portion 19 and on a side of the top surface 3 in the second portion 21. The second region 21b is located on a side farther from the first portion 19 than the first region 21a and on the side of the top surface 3 in the second portion 21. In addition, the first region 21a includes a first end portion T1 located close to the first portion 19, and a second end portion T2 located far from the first portion 19. The second region 21b includes a third end portion T3 located close to the first region 21a, and a fourth end portion T4 located far from the first region 21a. The second region 21b in the present embodiment is adjacent to a third surface 23 described later.

Figure 9:
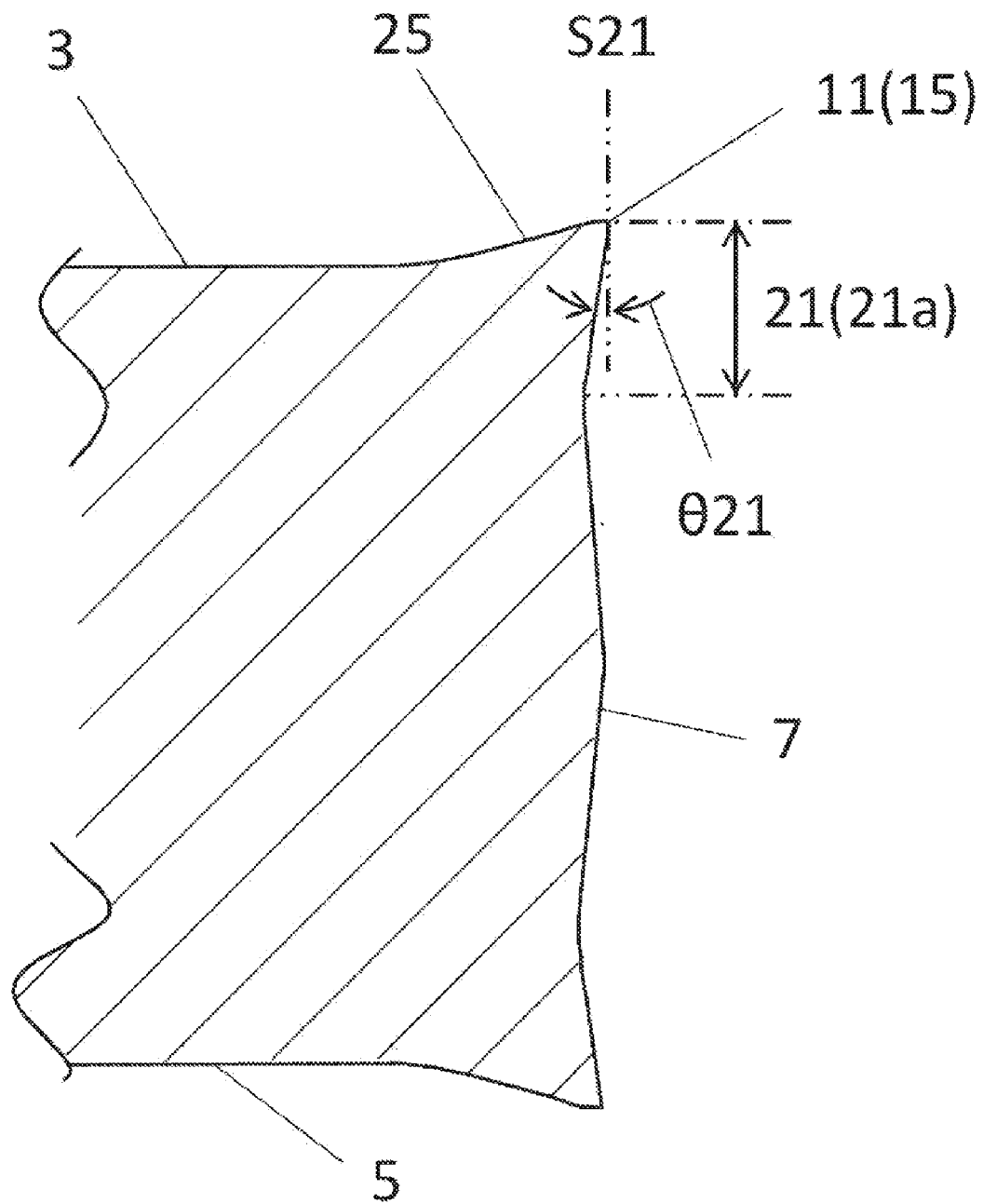
FIG. 9 is a C2 cross-sectional view of the insert illustrated in FIG. 7.
Figure 10:
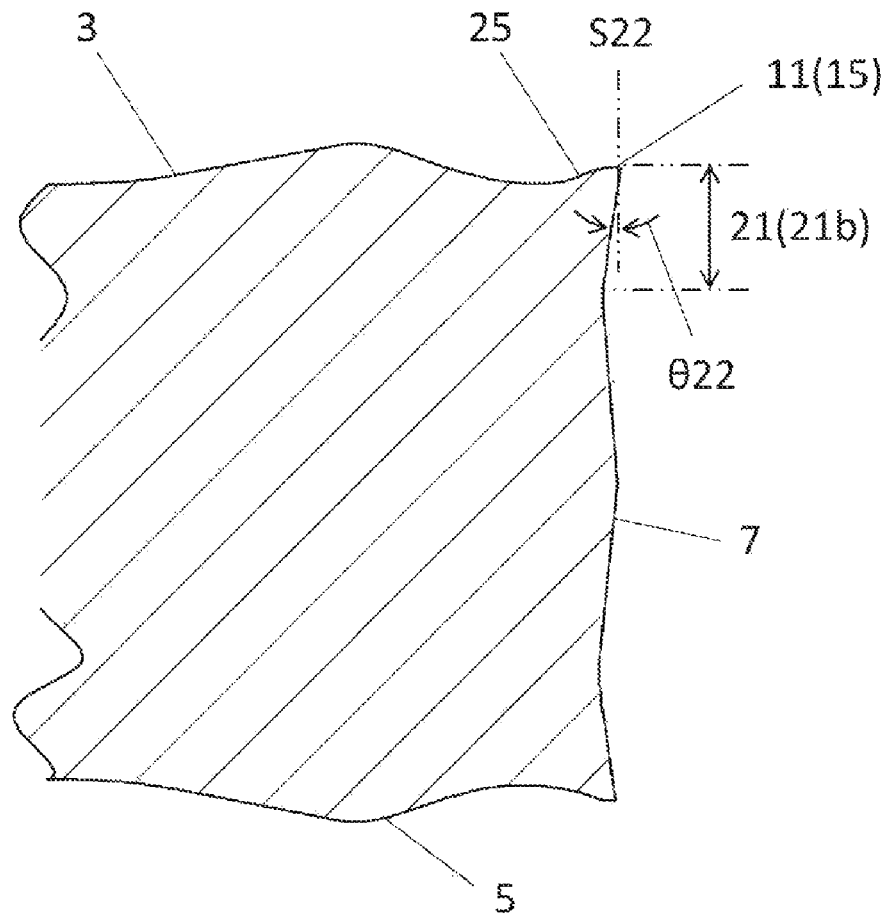
FIG. 10 is a C3 cross-sectional view of the insert illustrated in FIG. 7.

In the present embodiment, as illustrated in FIG. 9, the first region 21a inclines toward the central axis O1 as a distance to the second cutting edge 15 increases. As illustrated in FIG. 10, the second region 21b inclines toward the central axis O1 as a distance to the second cutting edge 15 increases. More specifically, as illustrated in FIG. 9 and FIG. 10, the first region 21a and the second region 21b of the second portion 21 incline with respect to respective virtual lines S21 and S22, parallel to the central axis O1 and tangent to the second cutting edge 15. Thus, the second portion 21 has a shape depressed inward with respect to the virtual line S21 or the virtual line S22, in a cross-section orthogonal to the second cutting edge 15.

In addition, the inclination angle $\theta 212$ at the second end portion T2 is greater than the inclination angle $\theta 211$ at the first end portion T1, and the inclination angle $\theta 222$ at the fourth end portion T4 is smaller than the inclination angle $\theta 221$ at the third end portion T3.

In the present embodiment, inclination angles at respective end portions satisfy the above-described relations. Accordingly, a larger clearance angle may be set in each of center portions (the second end portion T2 and the third end portion T3) playing a more important role as a flat cutting edge than both end portions (the first end portion T1 and the fourth end portion T4) of the second cutting edge 15. Thus, in the second portion 21 along the second cutting edge 15, it is possible, while securing strength of both the end portions, to secure a space between the second portion 21 and a workpiece in the center portion functioning as the flat cutting edge. As a result, an excellent finished surface having excellent strength is obtained.

Figure 16:
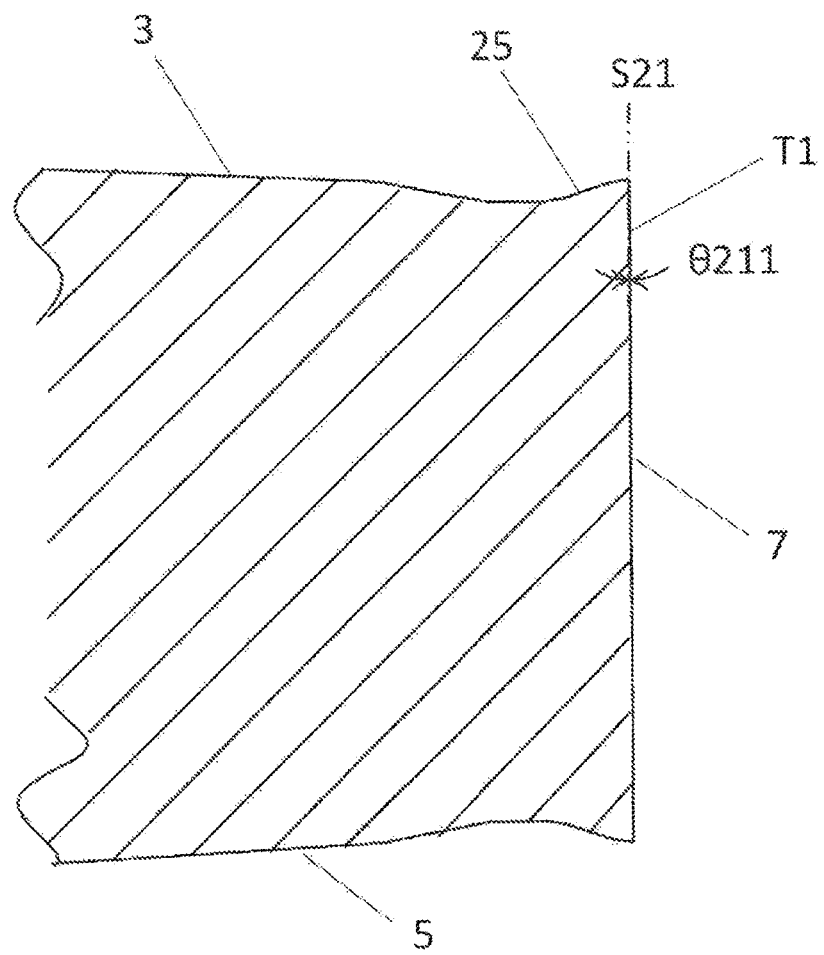
FIG. 16 is a C5 cross-sectional view of the insert illustrated in FIG. 7.
Figure 17:
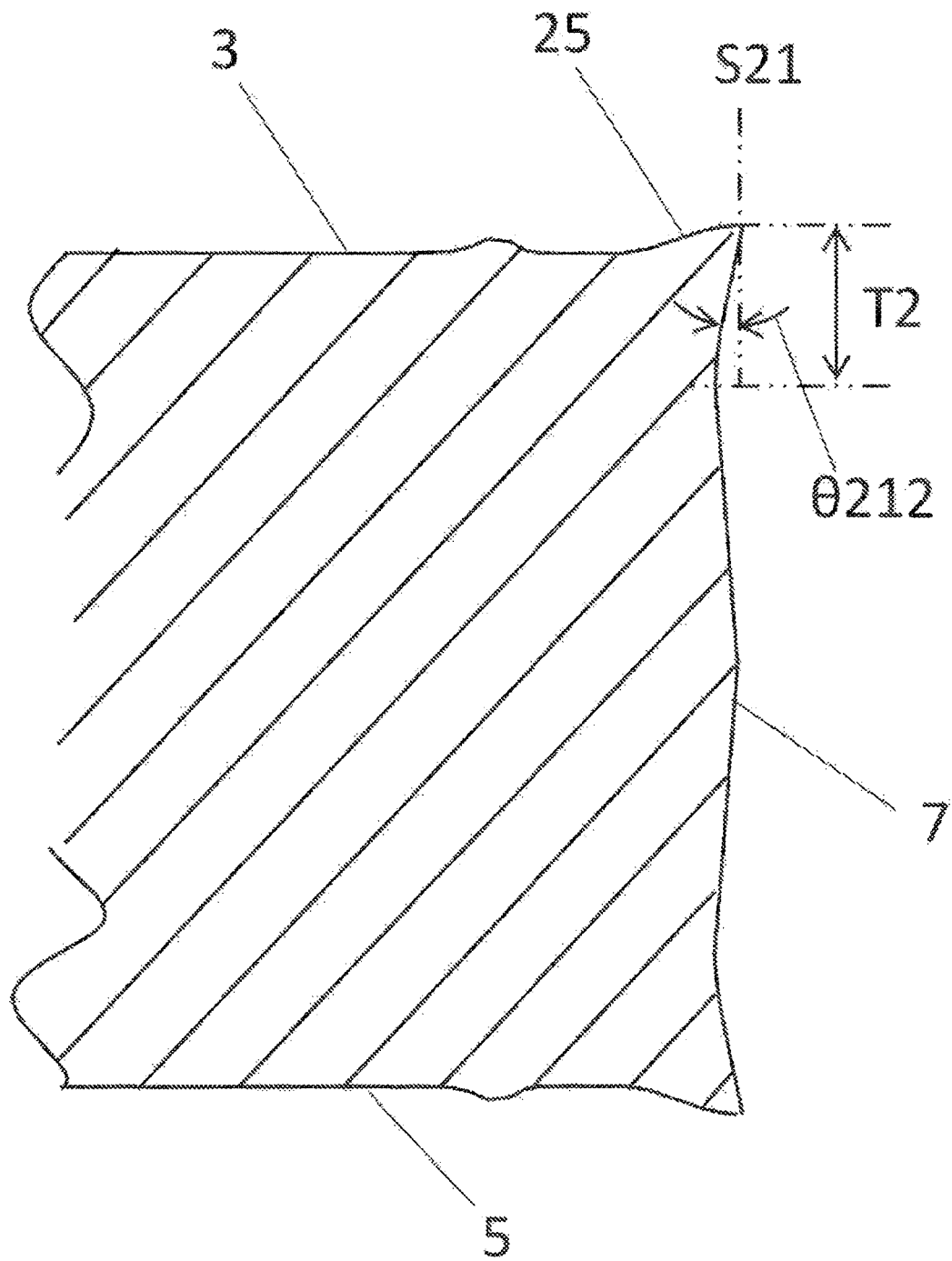
FIG. 17 is a C6 cross-sectional view of the insert illustrated in FIG. 7.
Figure 18:
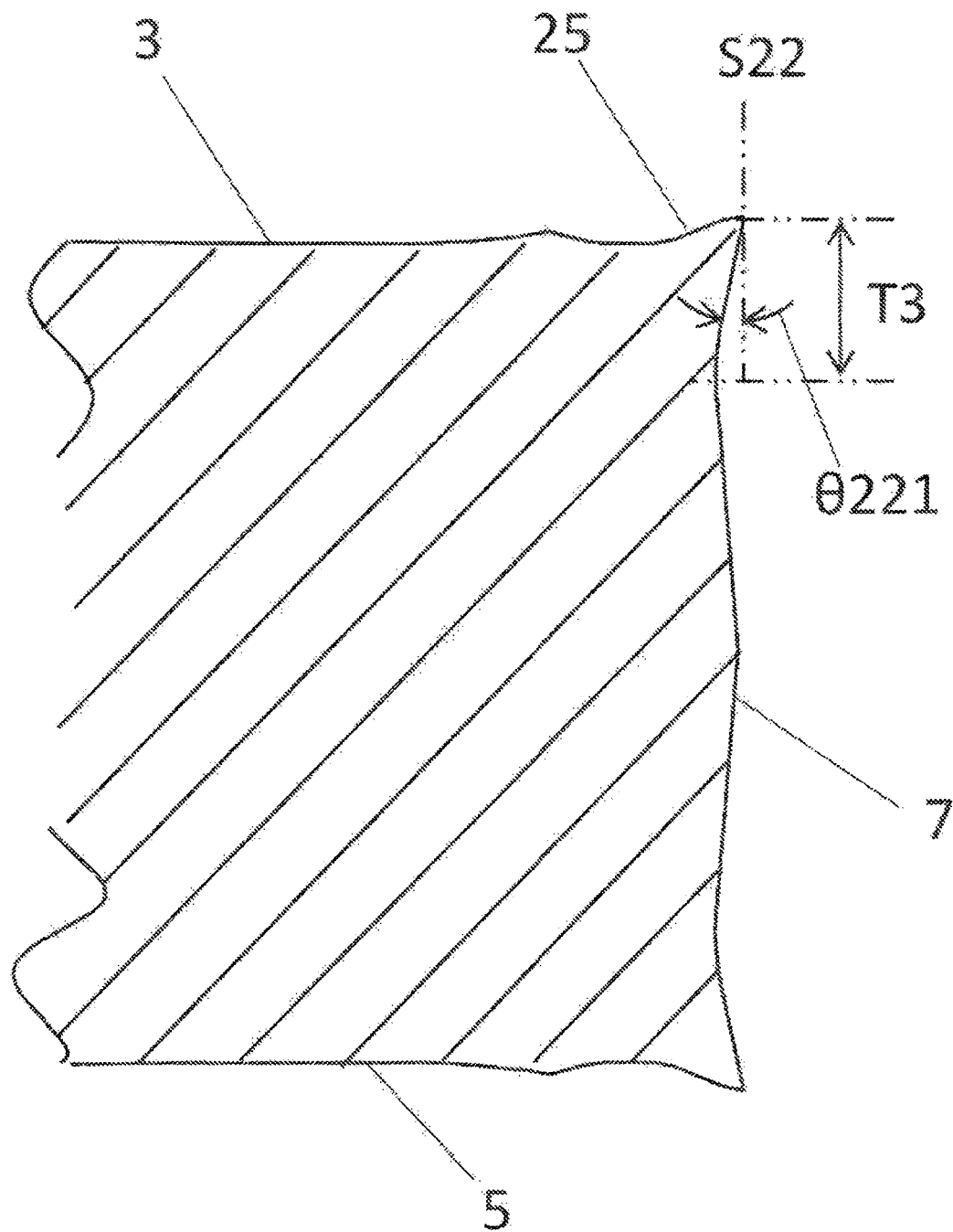
FIG. 18 is a C7 cross-sectional view of the insert illustrated in FIG. 7.
Figure 19:
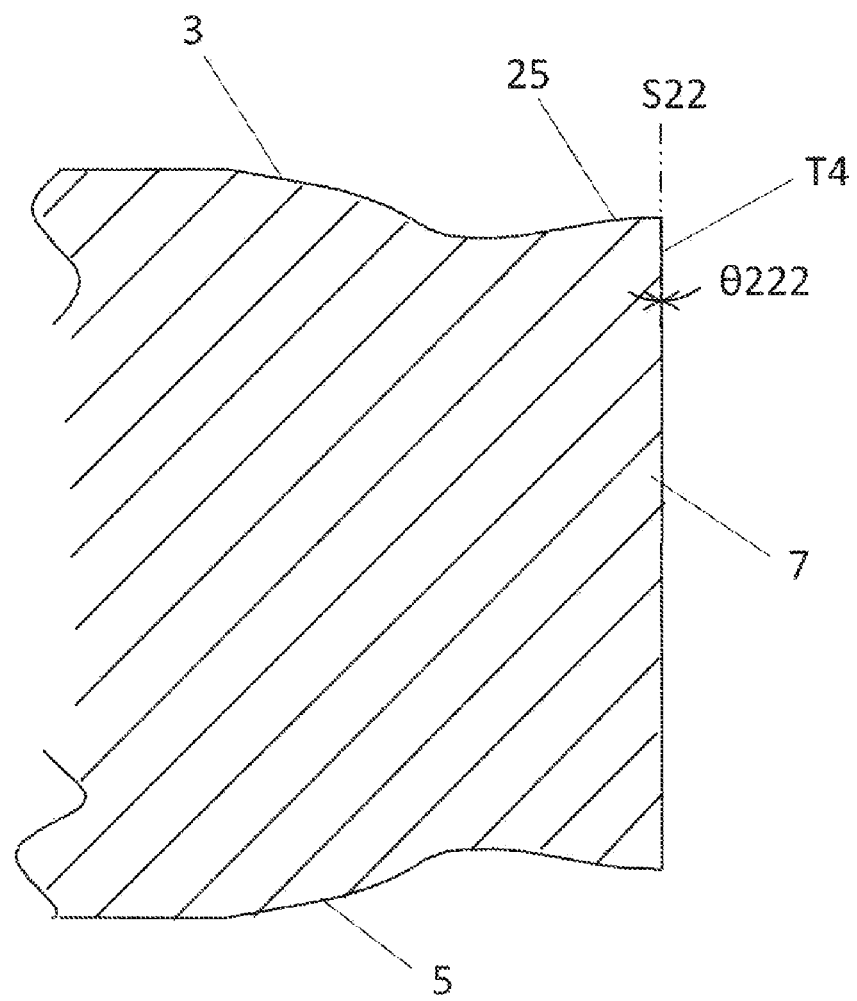
FIG. 19 is a C8 cross-sectional view of the insert illustrated in FIG. 7.

Here, it is possible to define the inclination angles at the respective end portions as follows, for example, as illustrated in FIG. 16 to FIG. 19. An explanation will be given using a definition of the inclination angle $\theta 211$ at the first end portion T1 as an example. As illustrated in FIG. 16, an inclination angle of the first region 21a with respect to the virtual line S21, parallel to the central axis O1 and tangent to an end portion corresponding to the first end portion T1 of the first region 21a of both the end portions of the second cutting edge 15, is defined as $\theta 211$. As described above, the inclination angle $\theta 211$ of the first region 21a is an angle referred to as a so-called clearance angle of the first region 21a.

Further, in the present embodiment, an inclination angle $\theta 21$ of the first region 21a increases as a distance to the first portion 19 increases, and an inclination angle $\theta 22$ of the second region 21b may decrease as a distance to the first portion 19 increases.

According to the above-described configuration, it is possible to reduce a possibility that stress concentrates on the second portion 21, and thus enhance an effect of securing excellent strength and an excellent finished surface.

Here, it is possible to define the inclination angles $\theta 21$ and $\theta 22$ as follows, similar to the above-described inclination angles $\theta 211$, $\theta 212$, $\theta 221$ and $\theta 222$. As illustrated in FIG. 9, an inclination angle of the second portion 21 with respect to the virtual line S21, parallel to the central axis O1 and tangent to the second cutting edge 15, can be defined as $\theta 21$. Additionally, as illustrated in FIG. 10, an inclination angle of the second portion 21 with respect to the virtual line S22, parallel to the central axis O1 and tangent to the second cutting edge 15, can be defined as $\theta 22$.

Further, an increasing rate of the inclination angle $\theta 21$ of the first region 21a may be greater than a decreasing rate of the inclination angle $\theta 22$ of the second region 21b. In this case, it is easy to secure a thickness and improve wear resistance of the insert 1 in a portion closer to the first cutting edge 13 functioning as a corner cutting edge.

Figure 8:
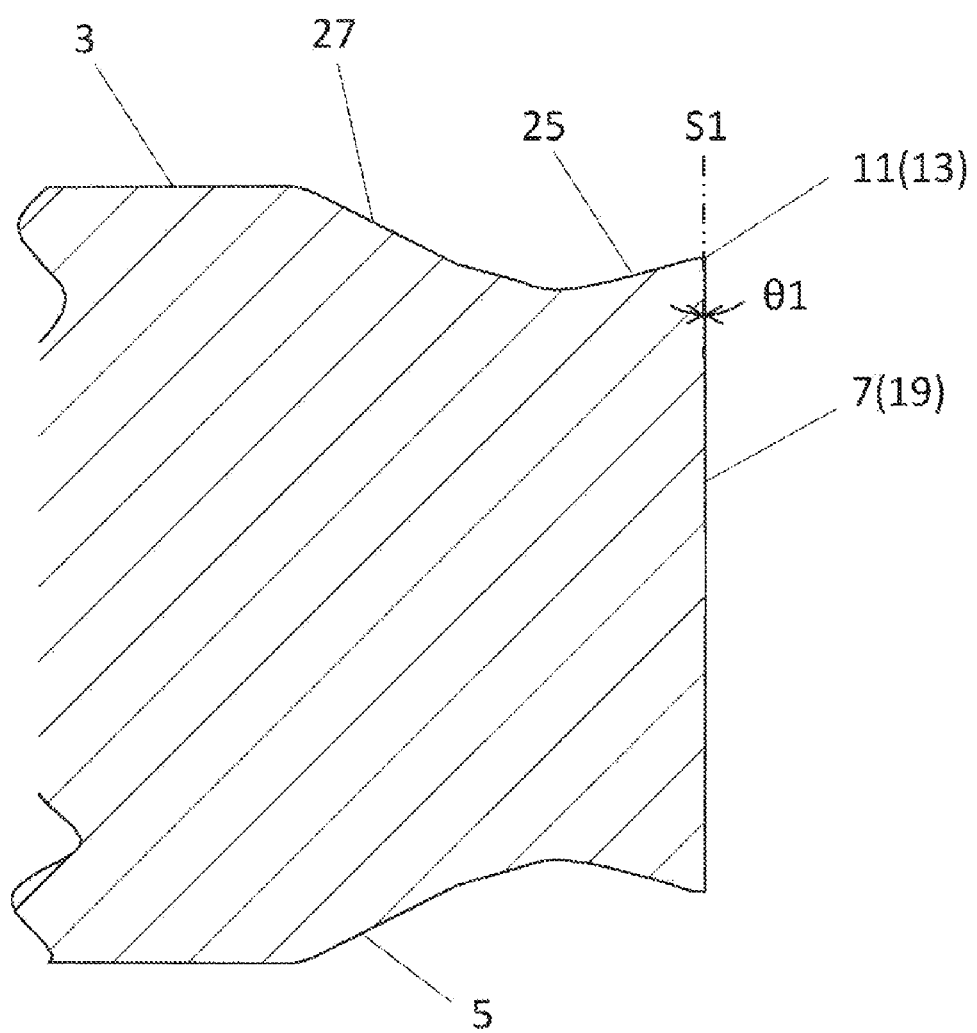
FIG. 8 is a C1 cross-sectional view of the insert illustrated in FIG. 7.

In the present embodiment, as illustrated in FIG. 8, when an inclination angle of the first portion 19 with respect to the virtual line S1, parallel to the central axis O1 and tangent to the first cutting edge 13, is defined as $\theta 1$, the inclination angle $\theta 1$ of the first portion 19 may be 0°. According to this configuration, the thickness of the insert 1 is secured in a portion located below the first cutting edge 13 functioning as a corner cutting edge. Thus, the insert 1 is strengthened. Note that, when the inclination angle $\theta 1$ of the first portion 19 is 0°, as illustrated in FIG. 8, the first portion 19 is illustrated in a linear shape in a cross-section taken along a bisector (so-called corner bisector) of the corner portion 3a.

Further, when the inclination angle $\theta 1$ of the first portion 19 is 0°, as illustrated in FIG. 8, the first portion 19 may be located continuously from the top surface 3 to the bottom surface 5. In this case, strength can be secured.

Additionally, in the present embodiment, the cutting edge 11 may further include a third cutting edge 17 adjacent to the second cutting edge 19. The third cutting edge 17 is located on the side portion 3b of the top surface 3, and is a region referred to as a so-called main cutting edge. Note that, as illustrated in FIG. 5, similar to the second cutting edge 15, two third cutting edges 17 may exist for one first cutting edge 13.

Here, the third cutting edge 17 has a linear shape in the top view, and the first cutting edge 13 and the second cutting edge 15 may have arc shapes in the top view. At this time, a radius of curvature R2 of an arc of the second cutting edge 15 may be greater than a radius of curvature R1 of an arc of the first cutting edge 13. According to this configuration, it is possible to enhance durability of the third cutting edge 17 to which a relatively large cutting load is applied when used as a main cutting edge, and to enhance a function as a flat cutting edge of the second cutting edge 15. Note that a reason why the function as the flat cutting edge of the second cutting edge 15 is enhanced is as follows: although a disposition angle of the second cutting edge 15 with respect to a workpiece is slightly shifted due to a manufacturing error, a mounting error, or the like in some case, an influence by the above-described shift can be reduced as long as the second cutting edge 15 satisfies the above-described configuration with respect to the first cutting edge 13. Note that, the first cutting edge 13, the second cutting edge 15 and the third cutting edge 17 are not limited to the above-described configuration. For example, the second cutting edge 15 may be formed in a linear shape in the top view, and the radius of curvature R2 of the arc of the second cutting edge 15 may be smaller than the radius of curvature R1 of the arc of the first cutting edge 13. For example, the third cutting edge 17 may be formed in a curved shape in the top view.

Figure 11:
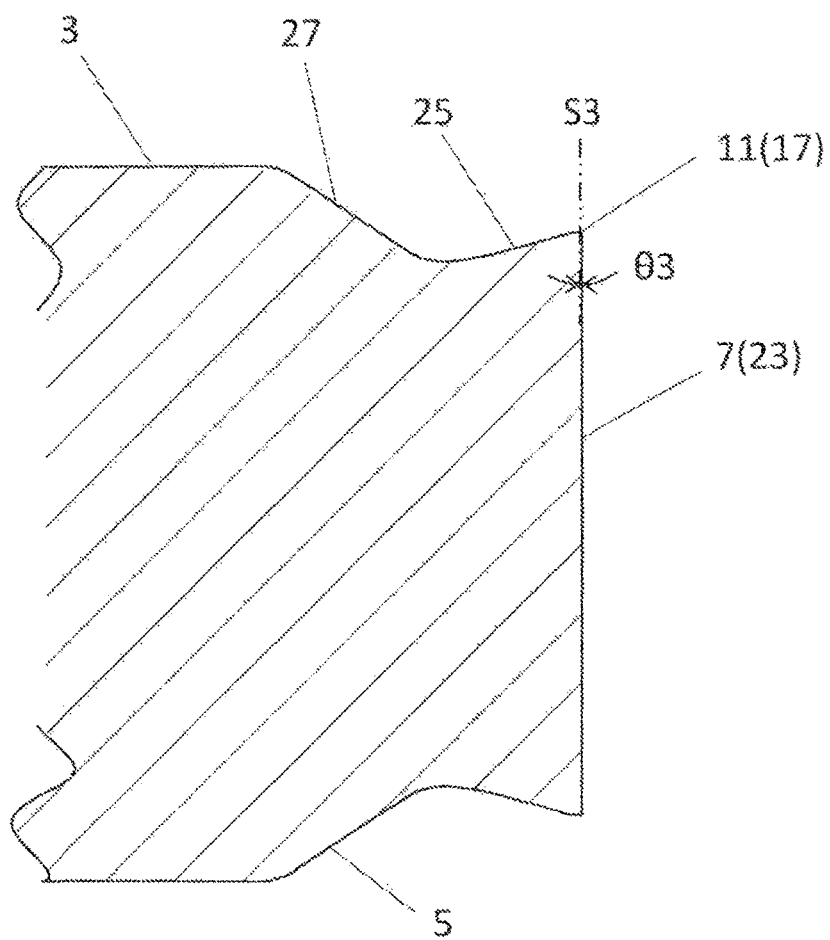
FIG. 11 is a C4 cross-sectional view of the insert illustrated in FIG. 7.

Additionally, in the present embodiment, the side surface 7 may further include a third portion 23 located along the third cutting edge 17. Further, as illustrated in FIG. 11, when an inclination angle of the third portion 23 with respect to a virtual line S3, parallel to the central axis O1 and tangent to the third cutting edge 17, is defined as θ3, the inclination angle θ3 of the third portion 23 may be constant. According to this configuration, since the inclination angle θ3 does not vary as a distance to the second portion 21 increases, durability of the third cutting edge 17 functioning as a main cutting edge is enhanced.

Further, as illustrated in FIG. 11, the inclination angle θ3 of the third portion 23 may be 0°. At this time, the third surface 23 having the inclination angle θ3 of 0° may be located continuously from the top surface 3 to the bottom surface 5. According to this configuration, the thickness of the insert 1 is secured in a portion located below the third cutting edge 17, thereby further enhancing the strength of the insert 1. Note that, when the inclination angle θ3 is 0°, as illustrated in FIG. 11, the third portion 23 is illustrated as a linear shape in a cross-section orthogonal to the third cutting edge 17.

Furthermore, in the present embodiment, as illustrated in FIG. 5, the second portion 21 may include a third region 21c in addition to the above-described first region 21a and the second region 21b. The third region 21c is a region located between the first region 21a and the second region 21b. An inclination angle θ23 of the third region 21c with respect to the central axis O1 may be constant. More specifically, in the third region 21c, the inclination angle θ23 may be constant from an end portion adjacent to the first region 21a to an end portion adjacent to the second region 21b.

According to this configuration, an inclination angle of the second portion 21 increases in the first region 21a as a distance to the first portion 19 increases (inclination angle θ21), is constant in the third region 21c (inclination angle θ23), and decreases in the second region 21b as a distance to the third region 21c increases (inclination angle θ22). Thus, heat generated during machining is easily radiated outward, in a wide area of the second portion 21 located along the second cutting edge 15 functioning as a flat cutting edge. As a result, precision of a finished surface is increased, and durability of the insert 1 is improved.

Additionally, as illustrated in FIG. 9 and FIG. 10, the second portion 21 may include regions (the first region 21a and the second region 21b) that once incline inward as respective distances to the second cutting edge 15 increase, and regions that are located below the respective above-described regions and incline outward as respective distances to the second cutting edge 15 increase. In this case, it is possible, while maintaining excellent finished surface precision, to secure the thickness of the insert 1 to enhance the strength thereof.

Note that, in the present embodiment, as illustrated in FIG. 5 and FIG. 6, the top surface 3 may include an inclined surface 25 that inclines downward as a distance to the cutting edge 11 increases. The inclined surface 25 functions as a so-called rake face. The inclined surface 25 inclines downward as a distance to the cutting edge 11 increases in order to make a chip flow smoothly. In other words, the inclined surface 25 inclines so as to proceed closer to the bottom surface 5 as a distance to the through-hole 9 decreases.

Additionally, in the present embodiment, as illustrated in FIG. 5 and FIG. 6, the top surface 3 may further include, in addition to the above-described inclined surface 25, a rising surface 27 located on an inner side of the top surface 3 (a side of the through-hole 9) relative to the inclined surface 25. The rising surface 27 plays a role of curling a chip flowing along the inclined surface 25 and making the chip a spiral shape. For the purpose of this, the rising surface 27 is located on the inner side relative to the inclined surface 25 and inclines upward as a distance to the inclined surface 25 increases.

Hereinbefore, an insert of an embodiment is described using the drawings; however, an insert of the present disclosure is not limited to the configuration of the above-described embodiment, and also includes modifications which are not described in detail particularly without departing from the gist of the present disclosure.

Cutting Tool

Next, description will be given of a cutting tool 101 of an embodiment using drawings.

Figure 12:
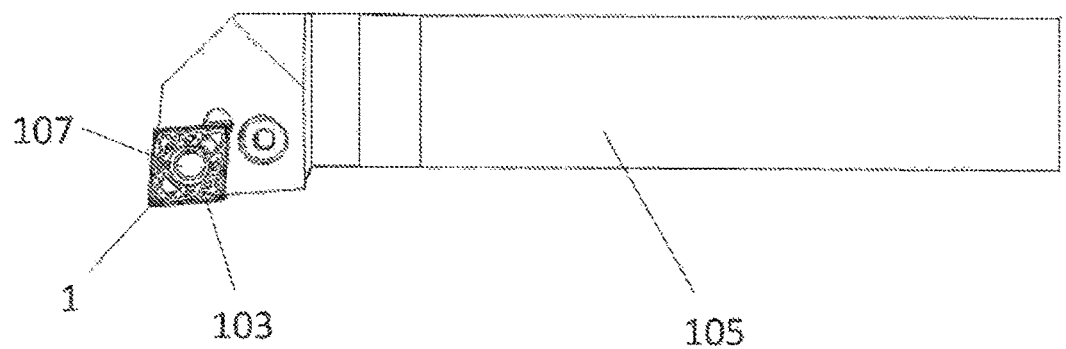
FIG. 12 is a top view illustrating a cutting tool of an embodiment.

The cutting tool 101 in the present embodiment is provided with a holder 105 including a pocket 103 on a side of a front end thereof and the above-described insert 1 located on the pocket 103, as illustrated in FIG. 12. In the cutting tool 101 of the present embodiment, the insert 1 is mounted such that a portion, along which the top surface 3 and the side surface 7 intersect and which is used as the cutting edge 11, protrudes from the front end of the holder 105.

The holder 105 is formed in a long and slender rod shape. Moreover, a side of the front end of the holder 105 is provided with one pocket 103. The pocket 103 is a portion on which the insert 1 is mounted, and is opened to a front end surface of the holder 105. At this time, the pocket 103 is opened to a side surface of the holder 105, making it possible to easily mount the insert 1. Specifically, the pocket 103 includes a seating face (not illustrated) abutting on the bottom surface 5 of the insert 1, and a binding side face (not illustrated) orthogonal to the seating face.

The insert 1 is located on the pocket 103. At this time, the bottom surface 5 of the insert 1 may directly contact the pocket 103, and additionally a sheet may be sandwiched between the insert 1 and the pocket 103.

In the present embodiment, the insert 1 is mounted on the holder 105 using a lever 107. That is, the insert 1 is mounted on the holder 105 by inserting the lever 107 into the through-hole 9 of the insert 1, and pressing a front end of this lever 107 against an inner wall of the through-hole 9 of the insert 1.

For a material of the holder 105, it is possible to use steel, cast iron, or the like, for example. In particular, steel with high toughness may be used among these members.

In the present embodiment, a cutting tool used in so-called turning processing is exemplified. As the turning processing, for example, boring, outer diameter processing, and groove-forming are cited. Note that, a cutting tool is not limited to those used in the turning processing. For example, the insert 1 of the above-described embodiment may be used as a cutting tool used in milling processing.

Method for Manufacturing Machined Product

Next, a description will be given of a method for manufacturing a machined product of an embodiment of the present invention while referencing the drawings.

The machined product is manufactured by machining a workpiece 201. The method for manufacturing a machined product in the present embodiment includes the following steps (1) to (3).

(1) rotating the workpiece 201.

(2) bringing the cutting tool 101, exemplified by the embodiment described above, into contact with the workpiece 201 that is rotating.

(3) separating the cutting tool 101 from the workpiece 201.

Figure 13:
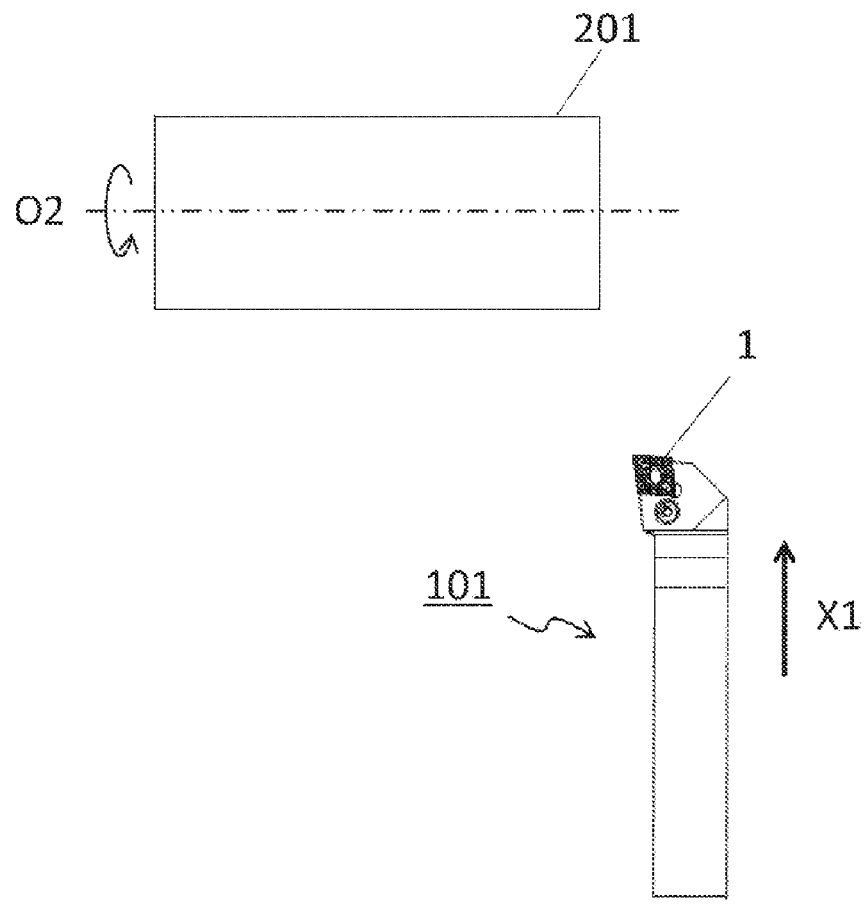
FIG. 13 is a schematic view illustrating a step of a method for manufacturing a machined product of an embodiment.
Figure 14:
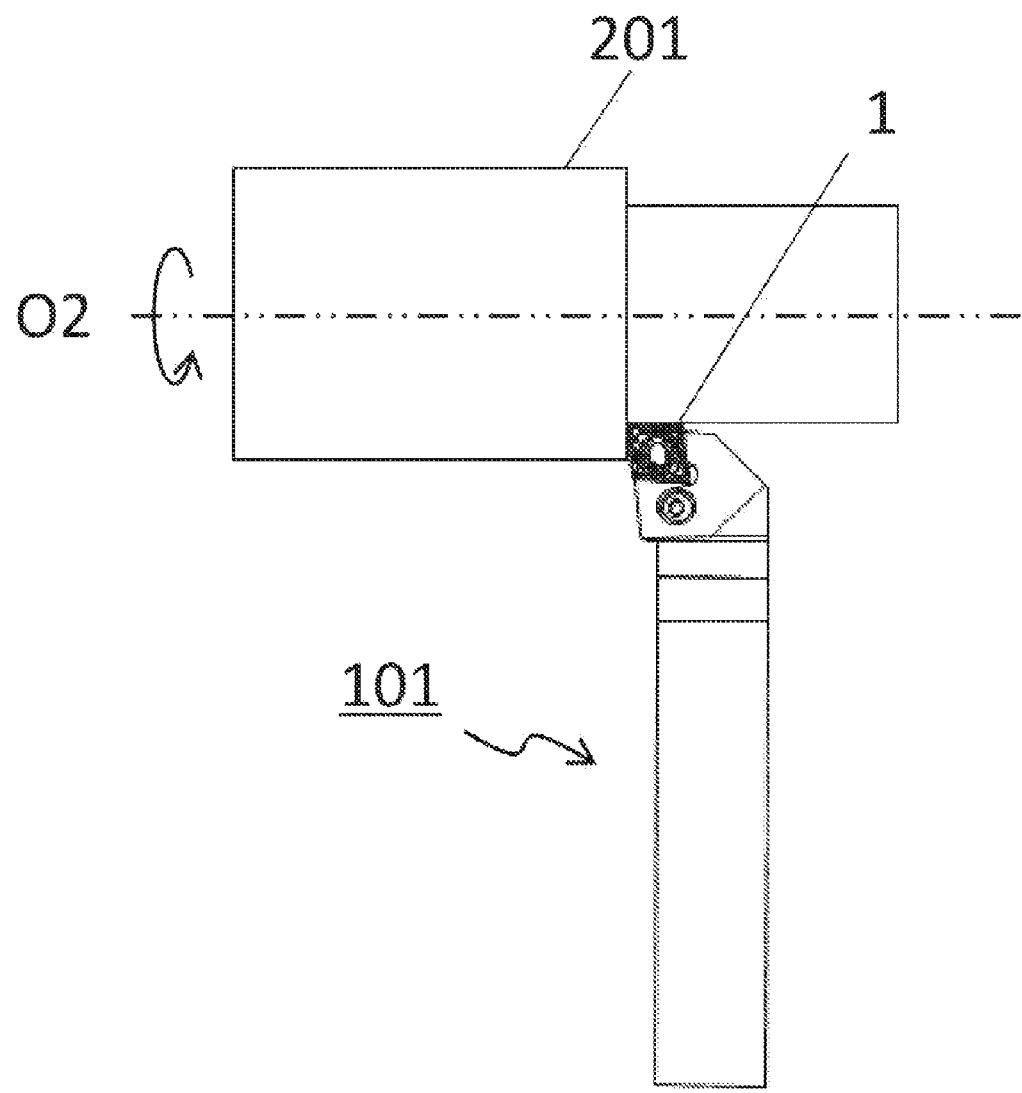
FIG. 14 is a schematic view illustrating a step of a method for manufacturing a machined product of an embodiment.
Figure 15:
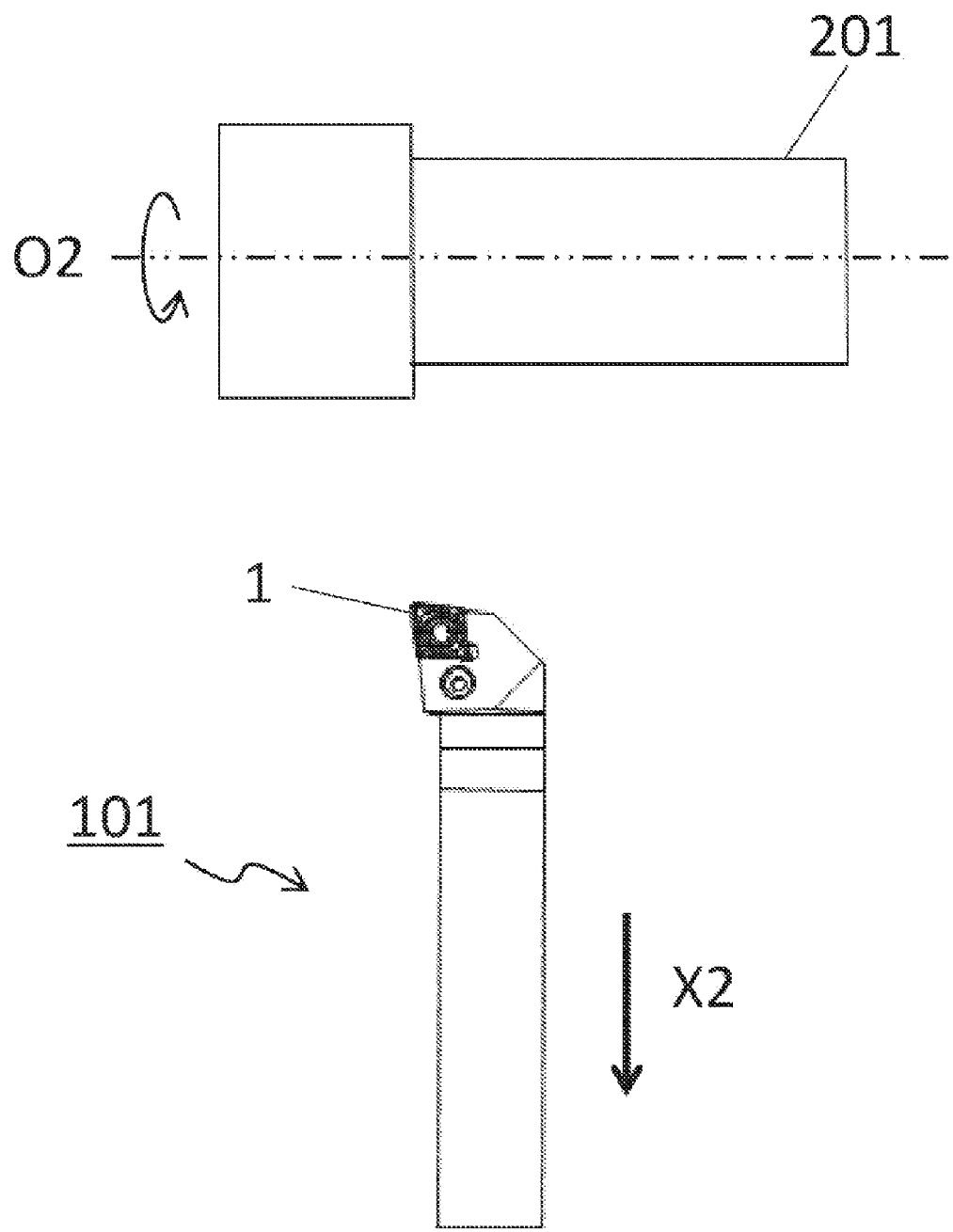
FIG. 15 is a schematic view illustrating a step of a method for manufacturing a machined product of an embodiment.

More specifically, first, as illustrated in FIG. 13, the workpiece 201 is made to rotate about an axis O2, and the cutting tool 101 is brought relatively near the workpiece 201. Next, as illustrated in FIG. 14, a ridge (cutting edge) of the cutting tool 101 is brought into contact with the workpiece 201 to cut the workpiece 201. Next, as illustrated in FIG. 15, the cutting tool 101 is relatively moved away from the workpiece 201.

In the present embodiment, the cutting tool 101 is brought close to the workpiece 201 by being moved in a direction X1 in a state where the axis O2 is fixed and the workpiece 201 is rotating about the axis O2. Furthermore, in FIG. 14, the workpiece 201 is cut by bringing the cutting edge of the insert 1 into contact with the workpiece 201 that is rotating. Furthermore, in FIG. 15, the cutting tool 101 is moved away from the workpiece 201 by being moved in a direction X2, while the workpiece 201 is rotating.

Furthermore, in the machining of the manufacturing method of the present embodiment, in each of the respective steps, although the cutting tool 101 is brought into contact with or separated from the workpiece 201 by moving the cutting tool 101, the present embodiment is of course not limited to such a mode.

For example, in step (1), the workpiece 201 may be brought close to the cutting tool 101. In the same manner, in step (3), the workpiece 201 may be moved away from the cutting tool 101. In a case where the machining is to be continued, steps of bringing the cutting edge of the insert 1 into contact with different places on the workpiece 201 may be repeated while maintaining the rotating state of the workpiece 201.

Here, representative examples of the material of the workpiece 201 include carbon steel, alloy steel, stainless steel, cast iron, non-ferrous metals, or the like.

Embodiments according to the present disclosure are described above. However, the present disclosure is not limited to the aforementioned embodiments, and naturally includes various modifications within a scope that does not deviate from the spirit of the present disclosure.

REFERENCE SIGNS LIST

1 Insert
3 Top surface (First surface)
3a Corner portion
3b Side portion
5 Bottom surface (Second surface)
7 Side surface (Third surface)
9 Through-hole
11 Cutting edge
13 First cutting edge
15 Second cutting edge
17 Third cutting edge
19 First portion
21 Second portion
21a First region
21b Second region
21c Third region
23 Third portion
25 Inclined surface
27 Rising surface
101 Cutting tool
103 Pocket
105 Holder
107 Lever
201 Workpiece
T1 First end portion
T2 Second end portion
T3 Third end portion
T4 Fourth end portion

What is claimed is:

1. A cutting insert comprising:
a first surface comprising a corner portion;
a second surface;
a third surface located between the first surface and the second surface, and intersecting the first surface;
a cutting edge located on at least part of an intersection of the first surface and the third surface; and
a central axis passing through a center of the first surface and a center of the second surface, wherein
the cutting edge comprises:
a first cutting edge located at the corner portion, and
a second cutting edge adjacent to the first cutting edge;
the third surface comprises:
a first portion located along the first cutting edge, and
a second portion located along the second cutting edge,
the second portion comprises a first region that inclines toward the central axis going away from the second cutting edge, and a second region that is located farther away from the first portion than the first region and inclines toward the central axis going away from the second cutting edge,
the first region comprises a first end portion and a second end portion, the first end portion is located closer to the first portion than the second end portion,
the second region comprises a third end portion and a fourth end portion, the third end portion located closer to the first region than the fourth end portion, and
a second inclination angle at the second end portion is greater than a first inclination angle at the first end portion, and a fourth inclination angle at the fourth end portion is less than a third inclination angle at the third end portion.

2. The cutting insert according to claim 1, wherein
a fifth inclination angle of the first region increases going away from the first portion, and a sixth inclination angle of the second region decreases going away from the first portion.

3. The cutting insert according to claim 1, wherein
the second portion further comprises a third region located between the first region and the second region, and
a seventh inclination angle of the third region with respect to the central axis is constant.

4. The cutting insert according to claim 1, wherein
the cutting edge further comprises a third cutting edge adjacent to the second cutting edge,
the third surface further comprises a third portion located along the third cutting edge, and
an eighth inclination angle of the third portion with respect to the central axis is constant.

5. The cutting insert according to claim 4, wherein
the eighth inclination angle is zero, and the third portion is located from the first surface to the second surface.

6. The cutting insert according to claim 4, wherein the first cutting edge and the second cutting edge are formed in circular arc shapes and the third cutting edge is formed in a linear shape in a top view, and a radius of curvature of the second cutting edge is greater than a radius of curvature of the first cutting edge.

7. A cutting tool comprising:
a holder comprising a pocket on a side of front end of the holder; and
the cutting insert according to claim 1, located in the pocket.

8. A method for manufacturing a machined product, the method comprising:
rotating a workpiece;
bringing the cutting tool according to claim 7 into contact with the workpiece that is rotating; and
separating the cutting tool from the workpiece.

9. A cutting insert comprising:
a first surface comprising a first corner portion and a second corner portion sequentially following the first corner portion;
a second surface;
a third surface located between the first surface and the second surface, and intersecting the first surface;
a cutting edge located on at least part of an intersection of the first surface and the third surface; and
a central axis passing through a center of the first surface and a center of the second surface, wherein
the cutting edge comprises:
a first cutting edge located at the first corner portion, and
a second cutting edge adjacent to the first cutting edge and between the first corner portion and the second corner portion;
the third surface comprises:
a first portion located along the first cutting edge, and
a second portion located along the second cutting edge,
the second portion comprises a first region that inclines toward the central axis going away from the second cutting edge, and a second region that is located farther away from the first portion than the first region and inclines toward the central axis going away from the second cutting edge,
the first region comprises a first end portion and a second end portion, the first end portion is located closer to the first portion than the second end portion,
the second region comprises a third end portion and a fourth end portion, the third end portion located closer to the first region than the fourth end portion, and
a second inclination angle at the second end portion is greater than a first inclination angle at the first end portion, and a fourth inclination angle at the fourth end portion is less than a third inclination angle at the third end portion.

10. The cutting insert according to claim 9, wherein a fifth inclination angle of the first region increases going away from the first portion, and a sixth inclination angle of the second region decreases going away from the first portion.

11. The cutting insert according to claim 9, wherein the second portion further comprises a third region located between the first region and the second region, and
a seventh inclination angle of the third region with respect to the central axis is constant.

12. The cutting insert according to claim 9, wherein the cutting edge further comprises a third cutting edge adjacent to the second cutting edge,
the third surface further comprises a third portion located along the third cutting edge, and
an eighth inclination angle of the third portion with respect to the central axis is constant.

13. The cutting insert according to claim 12, wherein the eighth inclination angle is zero, and
the third portion is located from the first surface to the second surface.

14. The cutting insert according to claim 12, wherein the first cutting edge and the second cutting edge are formed in circular arc shapes and the third cutting edge is formed in a linear shape in a top view, and
a radius of curvature of the second cutting edge is greater than a radius of curvature of the first cutting edge.

15. A cutting tool comprising:
a holder comprising a pocket on a side of front end of the holder; and
the cutting insert according to claim 9, located in the pocket.

16. A method for manufacturing a machined product, the method comprising:
rotating a workpiece;
bringing the cutting tool according to claim 15 into contact with the workpiece that is rotating; and
separating the cutting tool from the workpiece.

* * * * *